(12) United States Patent
Teyer et al.

(10) Patent No.: US 12,124,458 B2
(45) Date of Patent: Oct. 22, 2024

(54) DATABASE SYSTEM OBSERVABILITY DATA QUERYING AND ACCESS

(71) Applicant: Salesforce, Inc., San Francisco, CA (US)

(72) Inventors: Paymon Teyer, San Francisco, CA (US); Sumana Panjala, Hyderabad (IN); Robert Weber, San Francisco, CA (US); Priyanshu Singh, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/052,352

(22) Filed: Nov. 3, 2022

(65) Prior Publication Data

US 2024/0152521 A1    May 9, 2024

(51) Int. Cl.
*G06F 16/2457*    (2019.01)
*G06F 11/34*    (2006.01)
*G06F 16/242*    (2019.01)
*G06F 16/25*    (2019.01)

(52) U.S. Cl.
CPC .... *G06F 16/24575* (2019.01); *G06F 11/3409* (2013.01); *G06F 16/242* (2019.01); *G06F 16/256* (2019.01)

(58) Field of Classification Search
CPC .......... G06F 16/24575; G06F 11/3409; G06F 16/242; G06F 16/256
See application file for complete search history.

(56) References Cited

U.S. PATENT DOCUMENTS

| | | | |
|---|---|---|---|
| 9,940,033 B1* | 4/2018 | Alshawabkeh | ....... G06F 3/0653 |
| 10,489,170 B2 | 11/2019 | Toal et al. | |
| 10,810,230 B2 | 10/2020 | Toal et al. | |
| 11,082,519 B2 | 8/2021 | Toal et al. | |
| 11,126,608 B2 | 9/2021 | Weber et al. | |
| 2007/0220139 A1* | 9/2007 | Ohta | ....... G06F 11/3409 709/224 |
| 2012/0079098 A1* | 3/2012 | Moehler | ....... G06F 11/0775 709/224 |
| 2020/0285619 A1 | 9/2020 | Teyer | |
| 2020/0327037 A1 | 10/2020 | Toal et al. | |
| 2021/0019290 A1 | 1/2021 | Pang | |
| 2021/0406242 A1 | 12/2021 | Weber et al. | |
| 2023/0006907 A1* | 1/2023 | Mackie | ....... H04L 43/10 |

* cited by examiner

*Primary Examiner* — Jared M Bibbee
(74) *Attorney, Agent, or Firm* — Polygon IP, LLP

(57) ABSTRACT

A query may be determined based on data retrieval parameter values. The data retrieval parameter values may include a data type parameter identifying a designated data type of a plurality of data types corresponding with database observability data generated during operation of a database system. The of data retrieval parameter values may also include a designated time period during which to retrieve data associated with the designated data type. A query may be determined based on the plurality of data retrieval parameter values via a collection manager in a database application layer associated with the database system. The query may be executed to retrieve a designated dataset of database observability data corresponding with the designated data type and generated by the database system during the designated time period.

14 Claims, 7 Drawing Sheets

DATABASE SYSTEM OBSERVABILITY DATA QUERYING AND ACCESS

FIELD OF TECHNOLOGY

This patent document relates generally to database systems and more specifically to accessing observability data for monitoring database systems.

BACKGROUND

Database related incidents are a common cause of production outages in a large-scale cloud computing applications, especially when backed by a centralized relational database. Often such incidents are caused by a high number of active sessions or high database CPU usage. In order to detect, identify the source of, and remediate such incidents, support teams need to have access to various operational data. Operational data may include metrics and observability data collected at the database layer and/or the application layer.

The majority of modern database systems maintain very granular and comprehensive profiling data, logs, and metrics that can help with triaging and identifying underlying causes of database-related incidents. However, the sheer volume of this observability data, especially for a large scale application, means that continuous collection and storage of such data is extremely inefficient and costly. Accordingly, most modern cloud computing systems maintain only a limited amount of observability data, for instance deleting most data that is more than a few hours old. Additionally, in many systems access to observability data is only allowed for a small set of highly privileged users for security reasons. Nevertheless, access to this observability data is essential for support teams seeking to identify the causes of and solutions to production issues in a database system.

BRIEF DESCRIPTION OF THE DRAWINGS

The included drawings are for illustrative purposes and serve only to provide examples of possible structures and operations for the disclosed inventive systems, apparatus, methods, and computer program products for database system operation. These drawings in no way limit any changes in form and detail that may be made by one skilled in the art without departing from the spirit and scope of the disclosed implementations.

DETAILED DESCRIPTION

Figure 1:
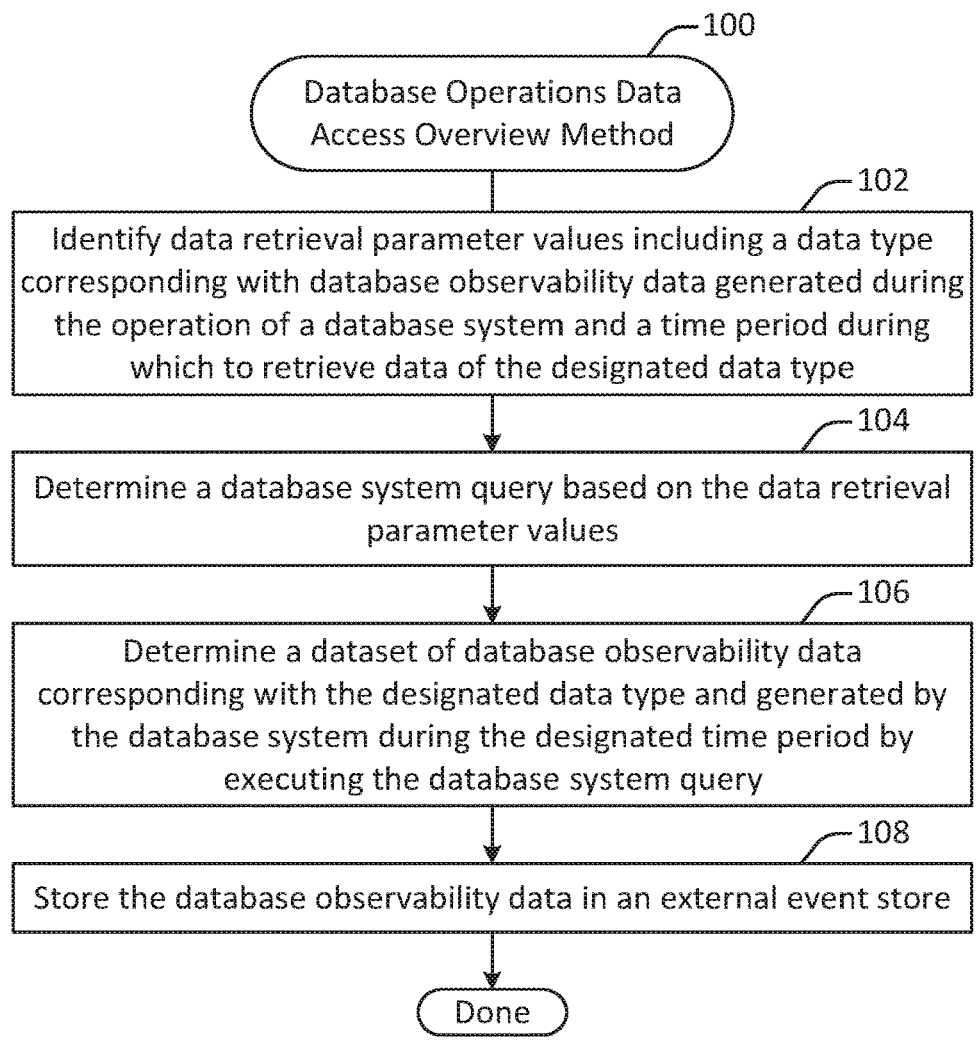
FIG. 1 illustrates an overview method for accessing observability data associated with a database system, performed in accordance with one or more embodiments.

Techniques and mechanisms described herein provide for systems, methods, devices, and computer readable media having instructions stored thereon for providing access to database system observability data. A trigger object including data retrieval parameter values may be stored in an external event store. The trigger object may then be retrieved from the external event store by a collection manager operating in an application layer of a datacenter. The collection manager may generate one or more queries based on the trigger object, and provide the queries to a query engine. The query engine may retrieve database system observability data based on the queries and provide the data to the collection manager. The collection manager may aggregate the database system observability data into an observability dataset and store the dataset in the external event store. Once in the event store, the dataset may be accessed by administrators seeking to address problems associated with the database system.

Consider the example of Alexandra, a systems engineer tasked with identifying the root cause of various database system problems, and then providing a remedy for those problems. When using conventional systems and techniques, Alexandra must manually access observability data stored in a variety of different locations in a data center. This observability data may be stored in a variety of different formats, such as customized logs, which may require distinct applications to access and process. Further, Alexandra may need access to observability data to which she lacks access permission. Moreover, because modern database systems generate such a large quantity of observability data, most datacenters discard such data after a period of time, which is typically limited to a few hours. In such a system, accessing the data needed to identify the root causes of database system problems is a time-intensive and manual process. Indeed, the data needed to identify the root causes of database system may often be deleted before it is even accessed.

When using techniques and mechanisms described herein, Alexandra may instead specify one or more trigger objects that identify parameters such as one or more types of observability data to collect and one or more time periods during which to collect the data. These trigger objects may then be retrieved by the database system and used to generate queries to retrieve database system observability data. Such data may then be aggregated and provided to Alexandra quickly and in a well-organized format. Thus, in contrast to conventional techniques, Alexandra may quickly and seamlessly access the data needed to identify, determine the source of, and correct problems in the database system. In this way, techniques and mechanisms described herein may improve the functioning of the database system itself, by providing for rapid assessment and correction of database system problems.

According to various embodiments, techniques and mechanisms described herein may provide for low-latency on-demand access to database profiling data, logs, and metrics from outside the production environments. In contrast, access to such information from outside the database system via conventional techniques may be either impossible or delayed.

According to various embodiments, techniques and mechanisms described herein may provide for the ability to safely query the database for granular observability data by providing an allow-list of queries and types of data and restricting users' access to only predetermined types of queries.

According to various embodiments, techniques and mechanisms described herein may significantly increase the accuracy of root-cause analysis. Alternatively, or additionally, the time to diagnose and/or time to remedy database system problems in production environments may be significantly reduced.

According to various embodiments, techniques and mechanisms described herein may be used to query and provide access to database observability data. Database observability data refers to information about the functioning of the database system itself. Such data may include, but is not limited to: database logs, database monitoring data, database metrics, database profiling information, and database tracing information. In some instances, such data may be stored within the database. For instance, a database system may output performance metrics or database logs to tables within the database. Alternatively, or additionally, such data may be stored outside the database system. For instance, database CPU usage records may be provided by an application host layer in which the database resides.

In some embodiments, database observability data may include active session history information. Active session history information may include information about active database sessions. Such information may include, but is not limited to: a list of all active sessions for the database during a period of time, a start time for one or more active sessions, and end time for one or more active sessions, wait time for one or more active sessions, CPU time for one or more active sessions, one or more users associated with one or more active sessions, user-level CPU usage for one or more active sessions, one or more queries run on the database through an active session, causes of delay for one or more active sessions, and/or combinations thereof.

FIG. 1 illustrates an overview method 100 for accessing observability data associated with a database system, performed in accordance with one or more embodiments. According to various embodiments, the method 100 may be performed at a database system such as the database system 200 shown in FIG. 2.

At 102, data retrieval parameter values are identified. The data retrieval parameter values include a data type parameter identifying a designated data type of a plurality of data types corresponding with database observability data generated during operation of a database system. The data retrieval parameter values also include a designated time period during which to retrieve data associated with the designated data type.

A database system query is determined at 104 based on the data retrieval parameter values. According to various embodiments, the database system query may be used to query database observability data. As discussed herein, database systems often maintain a wealth of observability data, which may include information such as requests received by the database system, operations logs, response times, connection information, and the like. Such information may be stored in a variety of formats and locations outside of the database itself.

According to various embodiments, determining the database system query may involve operations such as validating that the request for database observability data is both authorized and well structured, identifying one or more locations from which to retrieve data, and identifying one or more parameters for retrieving the data.

A dataset of database observability data corresponding with the designated data type and generated by the database system during the designated time period is determined at 106 by executing the database system query. As discussed with respect to operation 104, the execution of such a query may involve retrieving information from the database itself. Alternatively, or additionally, information may be retrieved from one or more sources external to the database, such as storage devices on which database logs or other observability data are stored.

The database observability data is stored in an external event store at 108. In some implementations, storing the database observability data in an external event store may involve one or more operations related to caching and/or batching data to provide for more efficient storage operations.

Figure 2:
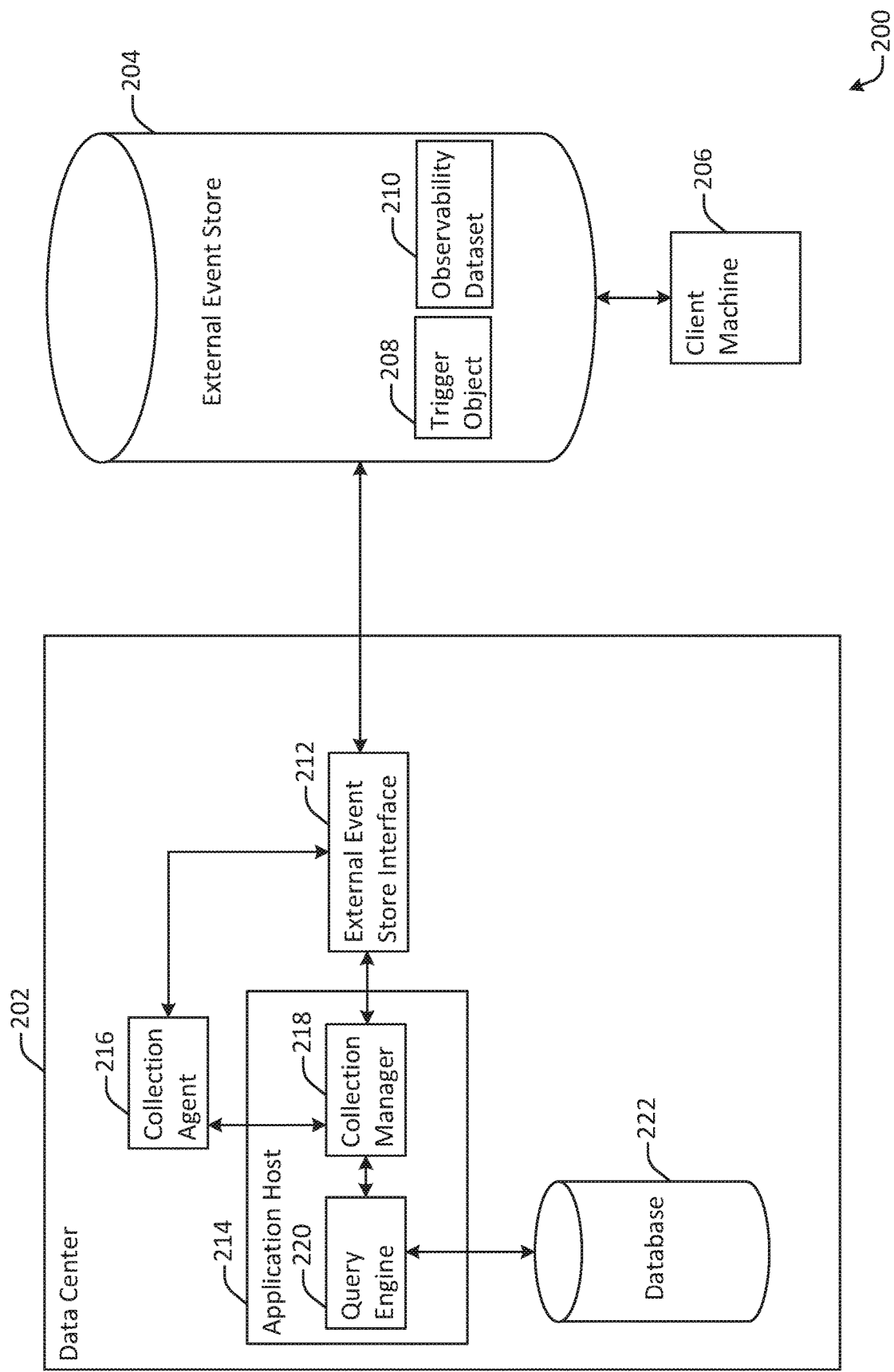
FIG. 2 illustrates an architecture diagram of an example of a database system, configured in accordance with one or more embodiments.

FIG. 2 illustrates an architecture diagram of an example of a database system 200, configured in accordance with one or more embodiments. The database system 200 includes a data center 202 in communication with a client machine 206 via an external event store. The external event store is configured to store trigger objects such as the trigger object 208 as well as observability datasets such as the observability dataset 210. The database system 200 may be used to perform one or more operations described herein, such as the method 100 shown in FIG. 1.

According to various embodiments, the data center 202 may house the database 222 and the application 214, as well as other devices and components for providing on-demand computing services. In some embodiments, the data center 202 may act as an on-demand computing services environment configured to provide a variety of computing services to enterprise customers via the internet.

In some embodiments, the data center 202 may be a physical data center. Alternatively, or additionally, all or a portion of the data center 202 may be a logical unit operating within a physical data center that includes other elements. As still another possibility, the data center 202 may be a logical unit spanning multiple physical data centers in a cloud computing configuration.

According to various embodiments, the external event store 204 is a scalable system capable of storing a variety of data in support of techniques and mechanisms described herein. For example, the external event store 204 may store observability datasets, which may include contextually rich time-series events, key/value pairs, and/or other types of observability data output by the query engine 220. As another example, the external event store 204 may store trigger objects, described in additional detail below.

In particular embodiments, an external event store may be located within the datacenter. That is, although the external event store 204 is external to the database, it need not necessarily be external to the data center 202.

In particular embodiments, a database system may include more than one external event store. For example, FIG. 1 shows a single external event store 204 storing both trigger objects and observability datasets. However, in some configurations trigger objects and observability datasets may be stored in different external event stores.

In some embodiments, the client machine 206 may be any computing device outside the data center and in communication with the external event store 204. For example, the client machine 206 may be associated with an organization accessing computing services via the data center 202. As another example, the client machine 206 may be associated with a support team working on behalf of the data center 202. For instance, the client machine 206 may be associated with an administrator or team of administrators tasked with identifying and addressing operations problems related to the data center 202.

According to various embodiments, the trigger object 208 may include parameters employed by the collection manager 218 to query the database for one or more types of observability data. For instance, the trigger object 208 may identify one or more types of data to query and/or one or more time periods during which to access the data.

In some embodiments, the trigger object may identify any or all of a variety of information. Such information may include, but is not limited to: a database table name, a time period for which the data is to be retrieved from the database, one or more filters for filtering the retrieved results, a start time for data collection, and end time for data collection, a query identifier for a pre-determined database query type, a cluster identifier, a database node identifier, a force trigger, and one or more splitting parameters. For instance, a trigger object may be formatted as follows:

```
Trigger Object{
    'timestamp': 1521860720690,
    'start': '1521860520690'
    'end':'1521860620690',
    'queryId': 'v_sql',
    'cluster': 'pod-123',
    'dbNode': '1',
    'queryFilter': 'id-123',
    'forceTrigger': true,
    'splitByMinute': true
}
```

In some implementations, a timestamp for the trigger object and/or the trigger object start and endpoints may be used for operations such as determining whether a trigger is stale, limiting data collection throughput, reducing the volume of data, and/or reducing the load on the production system.

In some embodiments, the database system observability data collection may be limited to a set of predetermined database query types, which may be identified as a field in the trigger object. In this way, the collection of data may be limited to particular database tables or other observability data sources. For instance, a trigger object may include a field that maps from a query identifier to a particular database query type. The query type may then be associated with metadata such as one or more access restrictions, optional and/or required parameter values, and a template for generating a query of the query type.

In some embodiments, a database may be divided into a number of clusters and/or nodes. Accordingly, a cluster identifier and/or a database node identifier may be used to limit the clusters and/or nodes the query is run on. In particular embodiments, more than one cluster identifier and/or node identifier may be used.

In some implementations, a trigger object may include a force trigger parameter. The force trigger parameter may be used to force the collection of data for a trigger object that has already been executed. Such a parameter may be useful if, for instance, it is anticipated that the results of such a query may change. However, by default, the collection agent 216 may cache the result of a trigger object and provide the cached result upon request, for instance to avoid unnecessarily burdening the database.

In some implementations, a trigger object may include a parameter indicating to the collection manager to split a database query into units of time, for instance at the minute level. Such a parameter may be useful if, for instance, a query is anticipated to return a large amount of data. In such a situation, the results may be split into separate files for tractability in analysis.

In some implementations, the application host 214, which may also be referred to as the application layer, performs various types of data center operations. For example, the application host 214 may be configured to implement one or more cloud computing applications, as described herein. Such applications may include those that involve storing information to the database 222 and/or retrieving information from the database 222.

According to various embodiments, the collection manager 218 is responsible for operations such as validating and processing trigger objects, orchestrating data collection using the query engine 220, and/or generating instructions to store the collected information to the external event store 204. The collection manager 218 may be implemented within the application host 214.

In some implementations, the collection manager 218 may poll the external event store through the external event store interface 212 for the existence of new trigger objects in the external event store 204. Alternatively, or additionally, the external event store 204 and/or the external event store interface 212 may push trigger objects to the external event store 212. As still another possibility, the client machine 206 may communicate with the data center 202 to inform the data center about the presence of a new trigger object.

In some embodiments, when a new trigger object 208 is detected, the trigger object 208 may be sent from the external event store 204 to the collection manager 218 via the external event store interface 212. The collection manager 218 may then validate the trigger object 208. For example, the collection manager 218 may confirm that the trigger object 208 is properly constructed and identifies observability data retrievable by the query engine 220. As another example, the collection manager 218 may confirm that client machine 206 was authorized to provide the trigger object 206 to retrieve the requested data.

In some implementations, the query engine 220 may include one or more processes inside the application layer that enforce access patterns and policies for accessing observability data collected within the database system. The query engine may execute queries provided by the collection manager 218 to retrieve the information. As discussed with respect to the collection manager 218, the information may be retrieved from the database itself. Alternatively, or additionally, the information may be retrieved from storage systems outside the database, such as storage locations dedicated to storing logs or other observability data. In some implementations, observability data may be stored in non-transitory storage. Alternatively, or additionally, observability data may be stored in transitory memory.

According to various embodiments, the database 222 may be any of a variety of database types, and may be configured in any of a variety of ways. For example, the database 222 may be a multitenant database storing information associated with a variety of tenants. Alternatively, the database system 222 may be organized in a single tenant fashion.

In some embodiments, the observability dataset 210 may include any of a variety of observability data associated with the database system and collected during one or more time periods. Such a dataset may be compiled by the collection manager 218 in conjunction with the collection agent 216 based on one or more queries executed by the query engine 220, and then persisted to the external event store 204 via the external event store interface 212.

According to various embodiments, the external event store interface 212 may serve as a proxy for the external event store 204. For example, the external event store interface 212 may expose the information stored in the external event store 204 to the application host 214. As another example, the external event store interface 212 may allow the application host 214 to store observability datasets generated by the application host 214 to the external event store 204.

The storage of observability datasets to the external event store 204 via the external event store interface 212 may be mediated by the collection agent 216. For example, the collection agent 216 may perform operations such as aggregating the results of queries executed by the query engine 220. As another example, the collection agent 216 may perform operations such as formatting datasets for storage in the external event store 204. As yet another example, the collection agent 216 may perform one or more caching and/or batching operations to avoid transmitting duplicative or data to the external event store 204 and/or to ensure that data is transmitted in a smooth and efficient fashion.

According to various embodiments, a database system may include more than one instance of an element. However, many elements are represented in FIG. 2 by only a single instance so as to more clearly illustrate techniques and mechanisms described herein. For example, an external event store may store potentially many different trigger objects and observability datasets. As another example, a data center may include more than one database 222, application host 214, collection agent 216, query engine 220, collection manager 218, and/or external event store interface 212

According to various embodiments, not all communicative connections between elements in a database system are shown in FIG. 2. Instead, communicative connections are selectively presented in FIG. 2 to better illustrate techniques and mechanisms described herein. For example, the client machine 206 may communicate directly with the data center 202, for instance in order to access data from the database 222 or to perform other types of operations.

Figure 3:
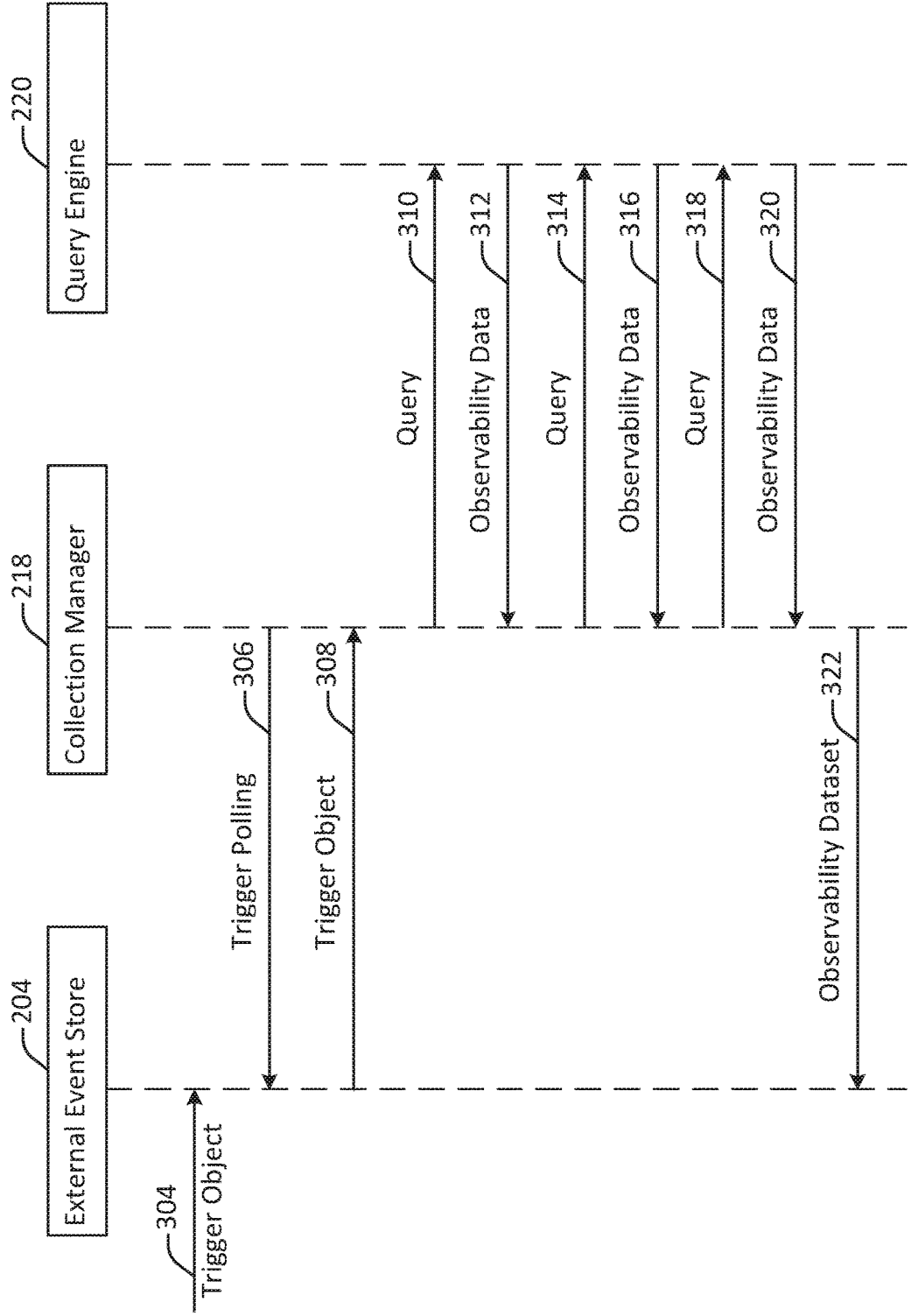
FIG. 3 illustrates a communication diagram characterizing communications in accordance with one or more embodiments.

FIG. 3 illustrates a communication diagram 300 characterizing communications in accordance with one or more embodiments. The communications diagram may reflect operations performed by various elements illustrated herein, including the external event store 204, the collection manager 218, and the query engine 220.

A trigger object is transmitted to the external event store at 304. According to various embodiments, the trigger object may be transmitted from a client machine.

The trigger object is transmitted to the collection manager 218 at 308. According to various embodiments, as discussed with respect to FIG. 2, the collection manager 218 may periodically poll the trigger object as shown at 306. Alternatively, or additionally, a trigger object may be pushed to the collection manager 218. As yet another possibility, the collection manager 218 may be notified when a trigger object is added to the external event store.

According to various embodiments, the collection manager 218 provides a query to the query engine at 310. The query engine 220 then executes the query to retrieve observability data, which is provided to the collection manager at 218.

In some implementations, as shown in FIG. 3, a single trigger object may trigger the generation of more than one query, such as the queries 310, 314, and 318 shown in FIG. 3. These queries may then be associated with the return of various observability data to the collection manager 218, as shown at 312, 316, and 320.

In some embodiments, a database system may include multiple database nodes. Different database nodes may be separately queried by the query engine, and may independently return information for aggregation by the collection manager 218.

In some embodiments, a database system may include various types of observability data that are stored separately. For instance, different types of observability data may be stored inside the database or outside the database in any of various storage locations. These different sources of observability data may be retrieved in a single query or via different queries, depending on the system configuration.

Figure 4:
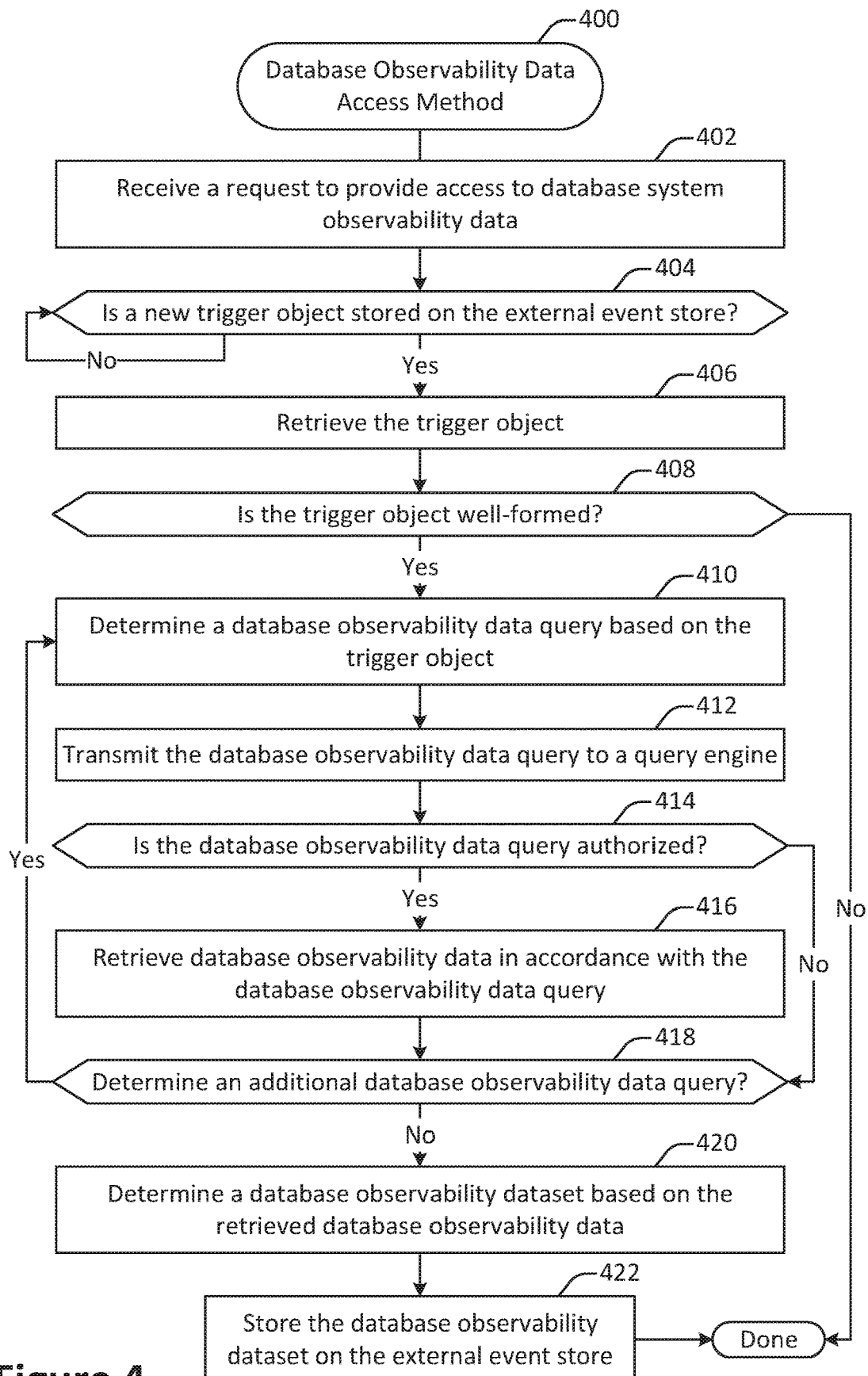
FIG. 4 illustrates an example of a method for providing access to database observability data, performed in accordance with one or more embodiments.

FIG. 4 illustrates an example of a method 400 for providing access to database observability data, performed in accordance with one or more embodiments. The method 400 may be performed at one or more systems described herein, such as the database system 200 shown in FIG. 2.

A request is received at 402 to provide access to database system observability data. In some implementations, the request may be generated at a particular time, such as when a database system application host is instantiated. Alternatively, or additionally, the request may be generated periodically, based on user input, or triggered in some other fashion.

A determination is made at 404 as to whether a new trigger object is stored in the external event store. In some implementations, the determination may be made based on active polling of the external event store. Alternatively, or additionally, the datacenter may be notified of the existence of a new trigger object, or the trigger object may be pushed to the datacenter when it is added to the event store.

In particular embodiments, the collection manager may coordinate across different application hosts to ensure that a trigger object is executed only once. Then, collection status may be updated directly to the external event store.

The trigger object is retrieved at 406. In some implementations, retrieving the trigger object may involve communicating with the external event store via the external event store interface 212.

A determination is made at 408 as to whether the trigger object is well-formed. In some implementations, the determination may be made by parsing the trigger object. Depending on the implementation, the trigger object may be formatted in various ways. For instance, the trigger object may be formatted as a JSON object or other type of structured data. In such a configuration, determining whether the trigger object is well-formed may involve operations such as determining whether the trigger object includes fields and values in the proper format, determining whether the fields within the trigger object correspond with fields known to the query engine 220, and determining whether the values of the fields correspond with valid values for those fields.

In particular embodiments, the collection manager may ensure that the trigger object identifies a valid query identifier, a valid duration of data requested, a valid timestamp associated with the initial request, and/or a database portion (e.g., a cluster and/or a node) to run on.

In particular embodiments, the collection manager may check to ensure that one or more guardrails for execution limits are not violated. For example, the collection manager may check the timestamp to ensure that requests older than a designated point in time are not run. As another example, the collection manager may check that the trigger object does not violate a global limit and/or a per-query type limit on the number of queries permitted in a designated time period. Information about query executions may be stored back in the external event store to allow such limits to be shared across clusters and/or hosts. As yet another example, the collection manager may check to ensure that query duration and/or query fields fall within acceptable parameter value ranges.

According to various embodiments, any or all of a variety of temporal restrictions on trigger objects may be imposed. For example, trigger timestamps may be limited to not being older than a particular point in time. As another example, trigger object timestamps may be limited to not being greater than the current time. As yet another example, a query start time may be limited to being within a designated number of prior days, hours, and/or months. As still another example, a query start time may be limited to being no later than a current date and/or time.

According to various embodiments, any or all of a variety of trigger object field restrictions may be imposed. For example, the collection manager may check to ensure that the trigger object includes any fields required by the predetermined database query type identified in the trigger object. As another example, the collection manager may remove one or more fields (e.g., unnecessary fields), compute a hash code, and compare the hash code against other hash codes of prior trigger objects to ensure that the same trigger object is not run repeatedly with different parameters. In the event that the same trigger object with different parameters is requested, the collection agent may instead provide access to a cached version of a prior trigger object.

According to various embodiments, any or all of a variety of query limit checks may be imposed. For example, the collection manager may check to ensure that a limit on the number of queries on a particular database table is not violated. As another example, the collection manager may employ a cache to avoid processing the same triggers with the same input. As yet another example, the collection manager may limit the maximum number of times that a trigger object may be re-executed using the force trigger parameter. As still another example, the collection manager may limit the number of triggers that may be processed during a given period of time (e.g., one minute). As still another example, the collection manager may impose a global query limit on the number of queries for a given cluster (e.g., on an hourly or daily basis).

A database observability data query is determined at 410 based on the trigger object. In some implementations, determining a database observability data query may involve operations such as identifying a database node at which to execute the query, determining one or more parameter values associated with the query, and formulating the query based on the one or more parameter values.

The database observability data is transmitted to the query engine at 412. In some implementations, each database node may be associated with the same query engine. Alternatively, different database query engines may be employed. For instance, different database nodes may be associated with different database query engines.

A determination is made at 414 as to whether the database observability data query is authorized. In some embodiments, the query transmitted to the query engine may identify a database system account associated with the database query. The database system account may be associated with one or more permissions. For instance, a database support team member may be authorized to access database systems observability data but not client data stored in the database itself. Similarly, a database system client may be authorized to access database systems client data associated with the client but not database systems observability data. As another example, different database support team members may be authorized to access different types of database system observability data. Thus, the determination made at 414 may involve comparing permissions associated with a database system account with the data requested by the database observability data query.

The database observability data is retrieved in accordance with the database observability data query at 416. In some implementations, retrieving the database observability data may involve retrieving the data of the designated data type within the designated time period. For instance, the designated time period may correspond to a period of time during which the observability data is generated. When the database is operating during the designated time period, observability data associated with the database may be stored to one or more storage locations. Such data may be identified based on the designated data type and then may be retrieved when it falls within the designated time period. A single database observability data query may retrieve data associated with one or more data types, as well as one or more time periods.

In particular embodiments, the query engine may perform one or more checks before executing a query. For example, as discussed with respect to operation 414, the query engine may enforce one or more access policies, which may be general or may be specific to a particular database table. As another example, the query engine may validate required and/or optional fields for predetermined database queries. As yet another example, the query engine may secure database connections specifying one or more nodes on which to execute a database query. As still another example, the query engine may determine whether a query may be executed on a spare node or a read-only database, which may reduce the load on active nodes and/or active databases.

A determination is made at 418 as to whether to determine an additional database observability data query. In some implementations, as discussed with respect to the communications diagram 300 shown in FIG. 3, a single trigger object may give rise to more than one database observability data query. For instance, different queries may correspond to different database nodes and/or different types of database systems observability data. Such queries may be determined and executed in sequence or in parallel.

A database observability dataset based on the retrieved database observability data is determined at 420. In some implementations, the database observability dataset may be determined by aggregating the database observability data retrieved at 416 into an organized whole. For instance, the database observability data may be organized into one or more data tables, which may be combined into one or more files.

In particular embodiments, the query engine may execute the database query to output the observability data into a database table (e.g., a table stored in memory). The query engine may then return to the collection manager a database pointer that the collection manager may use to obtain the results. In some embodiments, pagination may be used to reduce the size of data held in memory at a given time.

The database observability dataset is stored on the external event store at 422. In some implementations, storing the database observability dataset on the external event store may involve operations such as caching and/or batching. For instance, a collection agent may batch observability data for transmission to the external event store by an external event store interface.

In particular embodiments, one or more collection agents operating at the data center level may handle the transfer of observability datasets from the database to the external event store. For example, a collection agent may batch uploads, for instance to avoid transferring many small files. As another example, a collection agent may ensure that data is not dropped, for instance during a crash of the application host.

In some embodiments, once the data has been transferred to the external event store, it may be made available to any authorized users of the external event store. In this way, authorized users may access the queried data without needing to independently query the database system, even if the authorized users did not originate the trigger object leading to the construction of the observability dataset.

Figure 5:
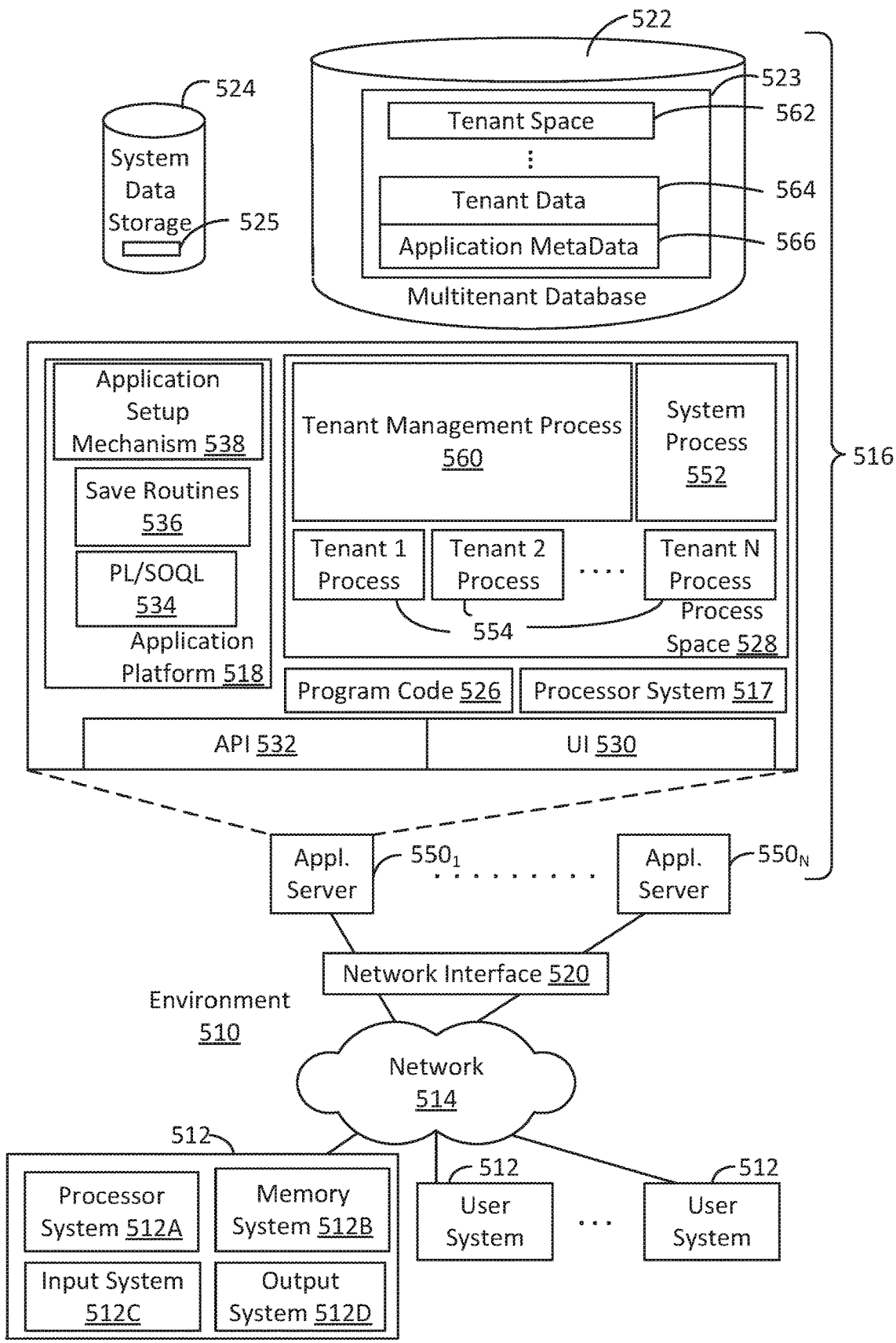
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based query engine and/or external event store system. For example, in some implementations, system 516 may include application servers configured to implement and execute database system monitoring software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
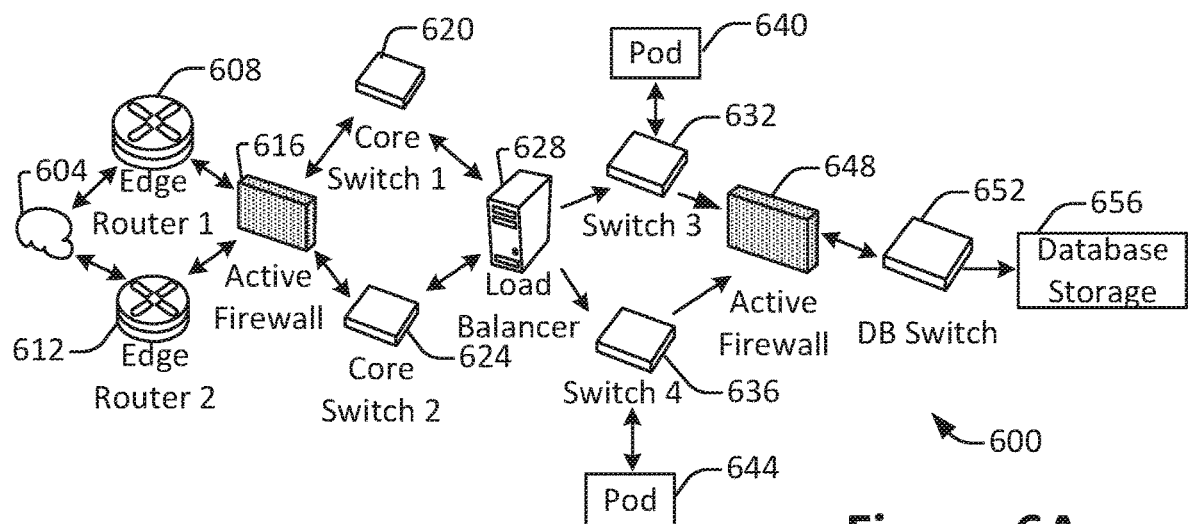
FIG. 6A shows a system diagram of an example of architectural components of an on-demand database service environment, configured in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems ?12 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process database systems operation information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
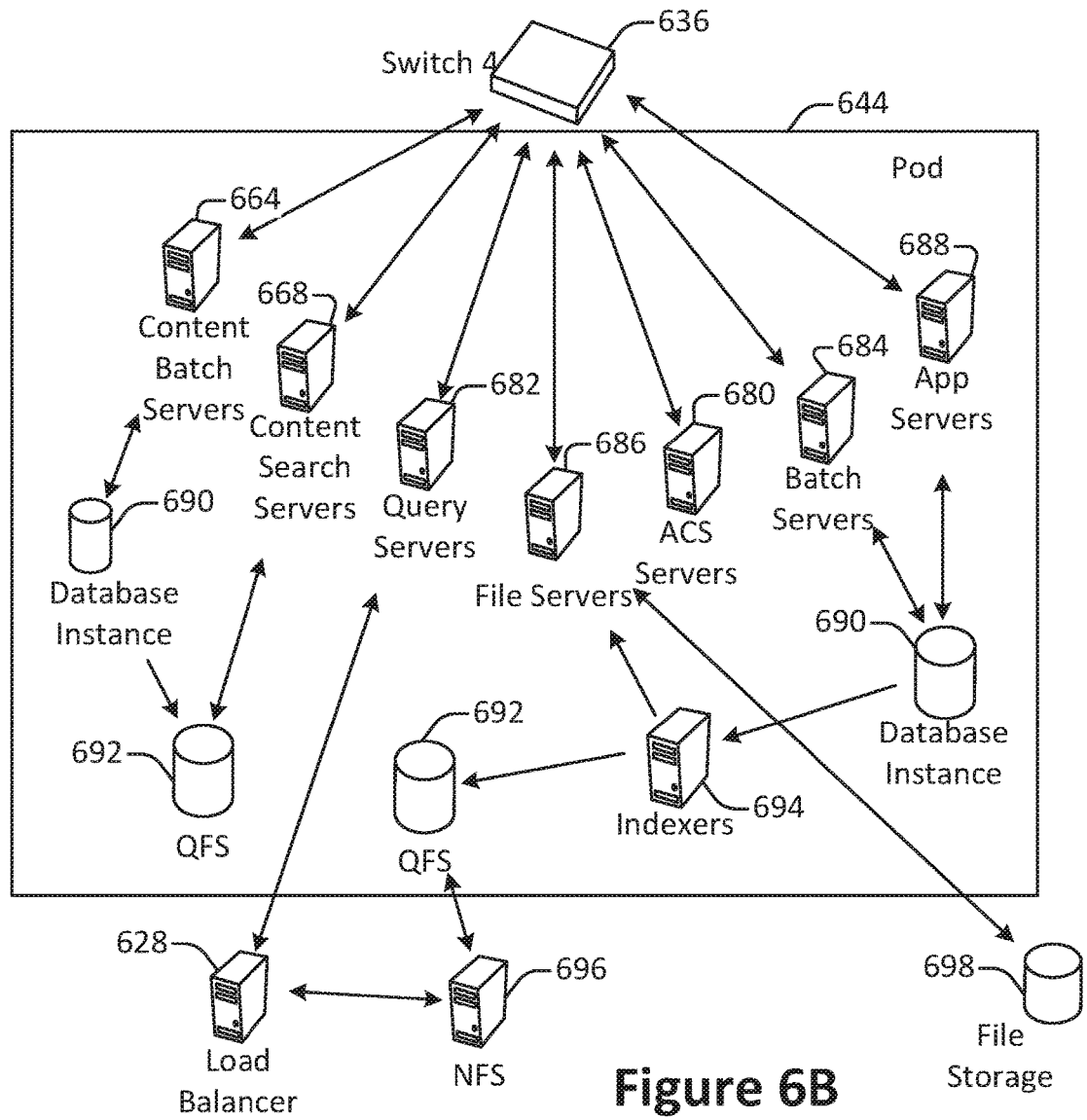
FIG. 6B shows a system diagram further illustrating an example of architectural components of an on-demand database service environment, in accordance with some implementations.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBS), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
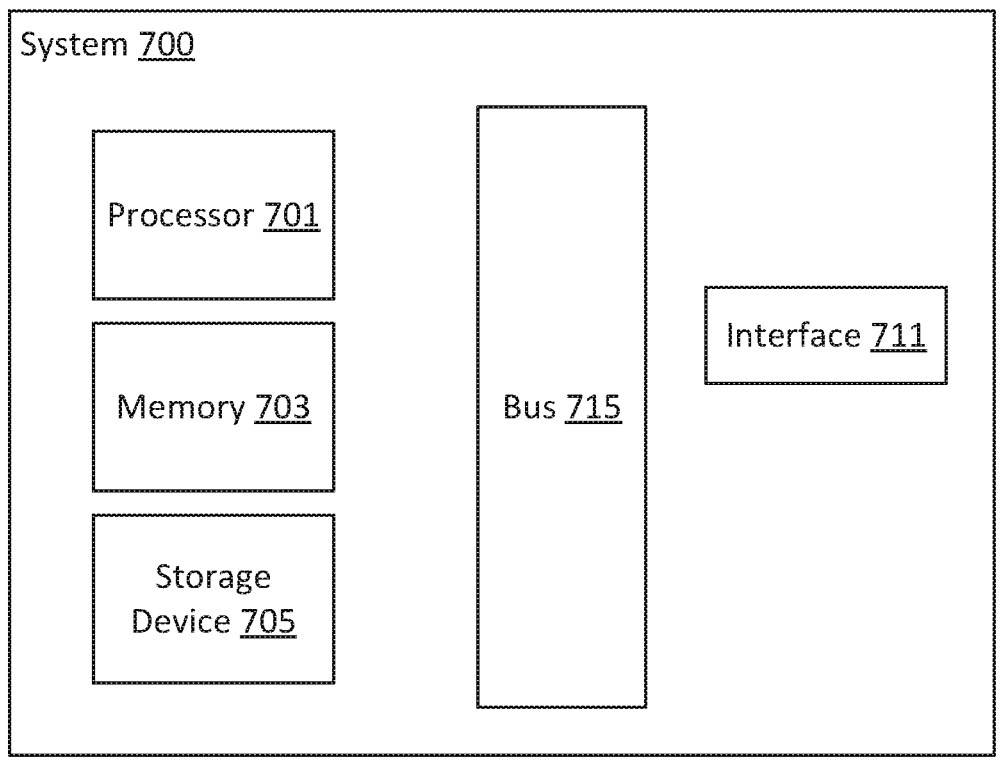
FIG. 7 illustrates one example of a computing device, configured in accordance with one or more embodiments.

FIG. 7 illustrates one example of a computing device, configured in accordance with one or more embodiments. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   receiving via a communication interface a plurality of data retrieval parameter values, the plurality of data retrieval parameter values including a data type parameter identifying a designated data type of a plurality of data types corresponding with database observability data generated during operation of a database system, the plurality of data retrieval parameter values also including a designated time period during which to retrieve data associated with the designated data type, wherein the data retrieval parameter values are included in a trigger object retrieved from an external event store and wherein the data retrieval parameter values include a database query identifier identifying a predetermined database query type and a plurality of values corresponding with a plurality of fields;
   determining a designated query based on the plurality of data retrieval parameter values via a collection manager in a database application layer associated with the database system by populating a database query template associated with the predetermined database query type based on the data retrieval parameter values;
   executing the designated query to retrieve a designated dataset of database observability data corresponding with the designated data type and generated by the database system during the designated time period; and
   storing the database observability data in the external event store.

2. The method recited in claim 1, wherein the designated query is one of a plurality of queries determined and executed based on the plurality of data retrieval parameter values, and wherein the designated dataset of database observability data includes data retrieved based on executing two or more of the plurality of queries.

3. The method recited in claim 1, wherein the data type parameter identifies a database table, and wherein executing the designated query comprises determining whether the designated query is authorized for execution based at least in part on the data type parameter.

4. The method recited in claim 1, wherein the plurality of data retrieval parameter values include a timestamp, and wherein the designated query is determined when the timestamp occurs after a designated point in time.

5. The method recited in claim 1, wherein the plurality of data retrieval parameter values includes a force trigger value, and wherein the method further comprises determining whether the data retrieval parameter values correspond to a previously executed query when it is determined that the force trigger value is false, and wherein the designated query is determined when it is determined that the data retrieval parameter values do not correspond to a previously executed query.

6. The method recited in claim 1, wherein the plurality of data retrieval parameter values are retrieved from the external event store.

7. The method recited in claim 1, the method further comprising:
   determining based on the plurality of data retrieval parameter values a database node of a plurality of database nodes for executing the designated query.

8. The method recited in claim 1, wherein the database observability data includes one or more queries run on the database during the designated time period.

9. The method recited in claim 1, wherein the database observability data includes information on one or more database sessions active during the designated time period.

10. The method recited in claim 1, wherein the database observability data includes information on computing resource usage associated with use of an active session by a user account during the designated time period.

11. The method recited in claim 1, wherein the database observability data includes information selected from the group consisting of: database log data, database monitoring data, database metrics, database profiling information, and database tracing information.

12. A database system comprising:
   a communication interface configured to receive a plurality of data retrieval parameter values, the plurality of data retrieval parameter values including a data type parameter identifying a designated data type of a plurality of data types corresponding with database observability data generated during operation of the database system, the plurality of data retrieval parameter values also including a designated time period during which to retrieve data associated with the designated data type, wherein the data retrieval parameter values are included in a trigger object retrieved from an external event store and wherein the data retrieval parameter values include a database query identifier identifying a predetermined database query type and a plurality of values corresponding with a plurality of fields;
   an application host implemented on one or more processors and configured to determine a designated query based on the plurality of data retrieval parameter values via a collection manager in a database application layer associated with the database system_by populating a database query template associated with the predetermined database query type based on the data retrieval parameter values;
   a database query engine configured to execute the designated query to retrieve a designated dataset of database observability data corresponding with the designated data type and generated by the database system during the designated time period; and
   an external event store interface configured to store the database observability data in an external event store.

13. The database system recited in claim 12, wherein the designated query is one of a plurality of queries determined and executed based on the plurality of data retrieval parameter values, and wherein the designated dataset of database observability data includes data retrieved based on executing two or more of the plurality of queries.

14. One or more non-transitory computer readable media having instructions stored thereon for performing a method, the method comprising:
- receiving via a communication interface a plurality of data retrieval parameter values, the plurality of data retrieval parameter values including a data type parameter identifying a designated data type of a plurality of data types corresponding with database observability data generated during operation of a database system, the plurality of data retrieval parameter values also including a designated time period during which to retrieve data associated with the designated data type, wherein the data retrieval parameter values are included in a trigger object retrieved from an external event store and wherein the data retrieval parameter values include a database query identifier identifying a predetermined database query type and a plurality of values corresponding with a plurality of fields;
- determining a designated query based on the plurality of data retrieval parameter values via a collection manager in a database application layer associated with the database system by populating a database query template associated with the predetermined database query type based on the data retrieval parameter values;
- executing the designated query to retrieve a designated dataset of database observability data corresponding with the designated data type and generated by the database system during the designated time period; and
- storing the database observability data in the external event store.

* * * * *